US009885100B2

(12) United States Patent
Vogli et al.

(10) Patent No.: US 9,885,100 B2
(45) Date of Patent: Feb. 6, 2018

(54) TERNARY CERAMIC THERMAL SPRAYING POWDER AND METHOD OF MANUFACTURING THERMAL SPRAYED COATING USING SAID POWDER

(71) Applicant: MESOCOAT, INC., Euclid, OH (US)

(72) Inventors: Evelina Vogli, Euclid, OH (US); Andrew J. Sherman, Euclid, OH (US); Curtis P. Glasgow, Euclid, OH (US)

(73) Assignee: MESOCOAT, INC., Euclid, OH (US)

(*) Notice: Subject to any disclaimer, the term of this patent is extended or adjusted under 35 U.S.C. 154(b) by 71 days.

(21) Appl. No.: 14/216,725

(22) Filed: Mar. 17, 2014

(65) Prior Publication Data

US 2014/0272171 A1 Sep. 18, 2014

Related U.S. Application Data

(60) Provisional application No. 61/798,032, filed on Mar. 15, 2013.

(51) Int. Cl.
*C04B 35/58* (2006.01)
*C23C 4/10* (2016.01)
(Continued)

(52) U.S. Cl.
CPC ................ *C23C 4/10* (2013.01); *B22F 1/007* (2013.01); *C04B 35/58* (2013.01); *C22C 29/14* (2013.01);
(Continued)

(58) Field of Classification Search
CPC . C04B 35/5805; C04B 35/58064; C23C 4/10; C22C 29/14
See application file for complete search history.

(56) References Cited

U.S. PATENT DOCUMENTS 3,394,450 A 7/1968 Gill et al.
4,015,100 A 3/1977 Gnanamuthu et al.
(Continued)

FOREIGN PATENT DOCUMENTS

DE 3247134 A1 6/1984
EP 0988898 A2 3/2000
(Continued)

OTHER PUBLICATIONS

1. H. Mizuno, J. Kiamura: MoB/CoCr Cermet Coatings by HVOF Spraying Against Erosion by Molten Al-Zn Alloy, J. Therm. Spray Tech. 16 [3] (2007) 404-413.
(Continued)

*Primary Examiner* — Karl Group
(74) *Attorney, Agent, or Firm* — Lance M. Pritikin

(57) ABSTRACT

The invention describes a method for producing ternary and binary ceramic powders and their thermal spraying capable of manufacturing thermal sprayed coatings with superior properties. Powder contain at least 30% by weight ternary ceramic, at least 20% by weight binary molybdenum borides, at least one of the binary borides of Cr, Fe, Ni, W and Co and a maximum of 10% by weight of nano and submicro-sized boron nitride. The primary crystal phase of the manufactured thermal sprayed coatings from these powders is a ternary ceramic, while the secondary phases are binary ceramics. The coatings have extremely high resistance against corrosion of molten metal, extremely thermal shock resistance and superior tribological properties at low and at high temperatures.

16 Claims, 2 Drawing Sheets

(51) Int. Cl.

| | |
|---|---|
| ***C22C 29/14*** | (2006.01) |
| ***C23C 4/12*** | (2016.01) |
| ***C23C 24/04*** | (2006.01) |
| ***B22F 1/00*** | (2006.01) |

(52) U.S. Cl.

CPC ................ *C23C 4/12* (2013.01); *C23C 24/04* (2013.01); *Y10T 428/12181* (2015.01)

(56) References Cited

U.S. PATENT DOCUMENTS

| | | | | |
|---|---|---|---|---|
| 4,071,641 | A | 1/1978 | Susai | |
| 4,212,900 | A | 7/1980 | Serlin | |
| 4,349,581 | A | 9/1982 | Asano et al. | |
| 4,490,411 | A | 12/1984 | Feder | |
| 4,515,832 | A | 5/1985 | Roeder et al. | |
| 4,533,389 | A | 8/1985 | Kapoor et al. | |
| 4,700,102 | A | 10/1987 | Camm et al. | |
| 4,745,245 | A | 5/1988 | Kitaide et al. | |
| 4,772,773 | A | 9/1988 | Hashimoto et al. | |
| 4,790,471 | A | 12/1988 | Turner | |
| 4,865,116 | A | 9/1989 | Peterson et al. | |
| 4,881,679 | A | 11/1989 | Turner | |
| 4,961,781 | A | 10/1990 | Morishita et al. | |
| 5,022,919 | A | 6/1991 | Shinozaki et al. | |
| 5,123,476 | A | 6/1992 | Fealey | |
| 5,238,481 | A | 8/1993 | Takagi et al. | |
| 5,456,950 | A | 10/1995 | Wood et al. | |
| 5,561,735 | A | 10/1996 | Camm | |
| 5,584,428 | A | 12/1996 | Satoh et al. | |
| 5,818,649 | A | 10/1998 | Anderson | |
| 5,993,915 | A | 11/1999 | Krebsbach | |
| 6,174,388 | B1 | 1/2001 | Sikka et al. | |
| 6,238,807 | B1 | 5/2001 | Yasuda | |
| 6,280,800 | B1 | 8/2001 | Thiele et al. | |
| 6,350,327 | B2 | 2/2002 | Neill | |
| 6,361,581 | B2 | 3/2002 | Yasuda et al. | |
| 6,432,555 | B1 | 8/2002 | Sikka et al. | |
| 6,540,800 | B2 | 4/2003 | Sherman et al. | |
| 6,572,518 | B1 | 6/2003 | Midorikawa | |
| 6,594,446 | B2 | 7/2003 | Camm et al. | |
| 6,621,199 | B1 | 9/2003 | Parfeniuk et al. | |
| 6,641,918 | B1 | 11/2003 | Sherman et al. | |
| 6,649,682 | B1 | 11/2003 | Breton et al. | |
| 6,691,397 | B2 | 2/2004 | Chakravarti | |
| 6,939,576 | B2 | 9/2005 | Deshpande et al. | |
| 6,984,255 | B2 | 1/2006 | Itsukaichi et al. | |
| 7,041,250 | B2 | 5/2006 | Sherman et al. | |
| 7,184,657 | B1 | 2/2007 | Camm et al. | |
| 7,220,936 | B2 | 5/2007 | Ott et al. | |
| 7,345,255 | B2 | 3/2008 | Jiang et al. | |
| 7,358,462 | B2 | 4/2008 | Timans | |
| 7,560,067 | B2 | 7/2009 | Sherman | |
| 7,635,515 | B1 | 12/2009 | Sherman | |
| 7,681,622 | B2 | 3/2010 | Sherman | |
| 7,862,911 | B2 | 1/2011 | Mizuno et al. | |
| 8,187,720 | B2 | 5/2012 | Choi et al. | |
| 8,206,792 | B2 | 6/2012 | Gollob et al. | |
| 2002/0051848 | A1 | 5/2002 | Li | |
| 2004/0194662 | A1 | 10/2004 | Itsukaichi et al. | |
| 2005/0116336 | A1 | 6/2005 | Chopra et al. | |
| 2006/0121292 | A1 * | 6/2006 | Weaver | C23C 4/02 428/457 |
| 2007/0132228 | A1 | 6/2007 | Montague | |
| 2008/0145649 | A1 | 6/2008 | Mannem | |
| 2009/0250439 | A1 | 10/2009 | Workman et al. | |
| 2010/0203255 | A1 | 8/2010 | Sherman | |
| 2010/0297432 | A1 | 11/2010 | Sherman et al. | |
| 2011/0259509 | A1 | 10/2011 | Pirie et al. | |

FOREIGN PATENT DOCUMENTS

| | | | | |
|---|---|---|---|---|
| JP | 60002676 | | | 1/1985 |
| JP | 360064785 | A | | 4/1985 |
| JP | 362177183 | A | | 8/1986 |
| JP | 362183967 | A | | 8/1987 |
| JP | 05140689 | | * | 6/1993 |
| JP | 9227243 | A | | 9/1997 |
| JP | 9268361 | A | | 10/1997 |
| JP | 09268361 | A | | 10/1997 |
| JP | 2012-102362 | A | | 5/2012 |
| RU | 2084554 | C1 | | 1/1985 |

OTHER PUBLICATIONS

2. H.P. Lv, J. Wang, C.S. Zhia, F. Li, B.D. Sun: Durability of HVOF Sprayed MoB/CoCr Coating on the 316L Stainless Substrate in Molten 55%Al-Zn-1.5%Si Bath, Thermal Spray 2007: Global Coating Solutions, B.R. Marple, M. Hyland, Y.C. Lau, C.J. Li, R.S. Lima, and G. Montavon, Ed., May 14-16, 2007 (Beijing, China), ASM International, Materials Park, OH, USA, 2007, p. 513-517.

John Bruce Neilson, An investigation of a Vortex Stabilized Arc, PhD Thesis University of British Columbia, Sep. 1981; This publication is viewable online at https://open.library.ubc.ca/cIRcle/collections/831/items/1.0085771; The publication is encrypted, and is therefore not able to be printed or uploaded via EFS-Web.

Todd A. Palmer, Implementation of Laser Cladding for Virginia Class Submarine Propulsion Shaft Repair, Institute for Manufacturing and Sustainment Technologies, Applied Research Laboratory, Pennsylvania State University, FY2011 Annual Report, p. 7.

Heping Lv, Pulin Nie, Yonggen Yan, Jun Wang, Baode Sun, Characterization and adhesion strength study of detonation-sprayed MoB—CoCr alloy coatings on 2Cr13 stainless steel substrate, J. Coat. Technol. Res. 7 (6) 801-807, 2010.

Joseph R. Davis, Nickel, cobalt, and their alloys: ASM Internat'l. Handbook Committee. 2000. p. 267-268.

The Bayou Companies, LLC, ID Coatings web page, published on http://www.bayoucompanies.com/coatings_id.html Internet site on Oct. 6, 2008; Evidence of this publication date was obtained from the Internet Archive Wayback Machine, which can be found online at http://www.archive.org.

The Metallurgy of Alloy 625; Stephen Floreen, Gerard E. Fuchs, Walter J. Yang; In: Superalloys 718, 625, 706 and Various Derivatives; Ed: E.A. Loria; The Minerals, Metals & Materials Society (1994).

THigh-Density-Infrared Transient Liquid Coatings; C.A. Blue, V.K. Sikka, E.K. Ohriner, P.G. Engleman, D.C. Harper; JOM-e 52(1)(2000)—Jan. 2000.

"Magnetic Levitation" published on https://en.wikipedia.org/wiki/Magnetic_levitation Internet site on Jan. 19, 2010; Evidence of this publication date was obtained from the Internet Archive Wayback Machine, which can be found online at http://www.archive.org.

EXAIR Air Knife (various models) Installation & Maintenance documents, copyright 2007-2010 by EXAIR Corporation.

"Air Knives" published on http://www.exair.com/en-US/Primary%20Navigation/Products/Air%20Knives/Pages/Air%20Knives%20Home.aspx Internet site, and pages relating thereto on the same site, on Sep. 30, 2009; Evidence of this publication date was obtained from the Internet Archive Wayback Machine, which can be found online at http://www.archive.org.

"Technology" published on http://www.mattson.com/technology.asp Internet site on Feb. 9, 2010; Evidence of this publication date was obtained from the Internet Archive Wayback Machine, which can be found online at http://www.archive.org.

"Vortek Arc Lamp" published on http://www.mattson.com/vortekarclamp.asp Internet site on Apr. 25, 2010; Evidence of this publication date was obtained from the Internet Archive Wayback Machine, which can be found online at http://www.archive.org.

Engineering drawings of EXAIR Air Knife (various models); copyright 1997-2003 by EXAIR Corporation.

"IODS—Weld Cladding, Pipe Cladding, Clad Pipe Fittings and Fabrication" published on http://www.offshore-technology.com/contractors/pipes/iods Internet site on Sep. 27, 2009; Evidence of this publication date was obtained from the Internet Archive Wayback Machine, which can be found online at http://www.archive.org.

(56) References Cited

OTHER PUBLICATIONS

"The Use of High Density Infrared Heating for Surface Modification/Coatings Processes" published at http://www.advancedmaterialsassoc.com/PDF-Gallery/oakridge_high_density_infrared_heating_paper.pdf Internet site; The PDF document properties suggest this paper was created Jul. 30, 2004. This document is encrypted, and therefore could not be printed or uploaded via EFS-Web.

Search Report issued in Applicant's corresponding Eurasian Pat. App. No. 20159118, which is submitted concurrently herewith; This search was completed Apr. 4, 2016.

* cited by examiner

TERNARY CERAMIC THERMAL SPRAYING POWDER AND METHOD OF MANUFACTURING THERMAL SPRAYED COATING USING SAID POWDER

This application claims priority to, and the benefit of, U.S. Provisional Patent Application No. 61/798,032, filed Mar. 15, 2013 with the U.S. Patent Office, which is hereby incorporated by reference.

STATEMENT REGARDING FEDERALLY SPONSORED RESEARCH AND DEVELOPMENT

This invention was made with government support under contract DE-SC0003454 awarded by the U.S. Department of Energy (DOE). The government has certain rights in this invention.

BACKGROUND OF THE INVENTION

The present invention relates generally to spraying powders, and more specifically, to thermal spray coatings using spray powder.

DESCRIPTION OF THE RELATED ART

It has become apparent that thermal sprayed coatings used for high temperature applications and in molten metal corrosion atmospheres require high corrosion resistance, thermal shock resistance (resistance to spallation during rapid change in temperature), high wear resistance at low and high temperatures, low friction coefficients and low porosity. With regard to manufacturing and overall performance, current tungsten carbide-cobalt (WC—Co) High Velocity Oxygen Fuel (HVOF) coatings have spallation problems under point loads, corrosion limitations, and are expensive. For example, WC—Co thermal spray coatings are currently used as wear resistant coatings on steel rolls submerged in a molten zinc and aluminum bath, but such coatings dissolve within 48 hours. Accordingly, there is a need to improve roll lifespan beyond its current life. It is also noted that the cost of frequently replacing these rolls is a significant portion of the cost of galvanized metals. Alternate manufacturing materials have drawbacks as well. For example, weld overlays require extensive machining, and still have limited wear and corrosion performance. Similar issues occur in deep drawing dies and die cutters, which wear down and then lead to sticking due to improper clearance as well as in die casting and extrusions.

It is noted that references JP 9-268361, JP 9-227243, US 2004/0194662, U.S. Pat. No. 6,238,807, and U.S. Pat. No. 7,862,911 disclose either thermal sprayed powders or thermal sprayed coatings containing molybdenum boride, nickel, chromium and tungsten. However, the resulting coatings do not demonstrate superior thermal shock resistance, wear and corrosion resistance under molten metal environment.

Therefore, there is a need to develop a spray powder to form coatings providing improved resistance against molten metal corrosion environment, superior thermal shock resistance and high wear resistance at high temperatures.

SUMMARY OF THE INVENTION

Particular embodiments of the present invention comprise a thermal spray powder comprising: one or more ternary boride ceramics of Metal-Mo—B, Metal-$Mo_2$—$B_2$, or $Metal_2$-$Mo_2$—$B_2$ from about 20-70% by weight, where Metal is Co, Ni or Fe; one or more binary molybdenum borides from 0-60% by weight; and, one or more metal binary borides from 0-50% by weight, where the one or more metal binary borides are selected from Cr, Fe, Ni, W, and Co.

Further embodiments of the present invention comprise a method of manufacturing a thermal spray powder, the steps comprising: providing a composition comprising: one or more ternary boride ceramics of Metal-Mo—B, Metal-$Mo_2$—$B_2$, or $Metal_2$-$Mo_2$—$B_2$ from about 20-70% by weight, where Metal is Co, Ni or Fe; one or more binary molybdenum borides from 0-60% by weight; and, one or more metal binary borides from 0-50% by weight, where the one or more metal binary borides are selected from Cr, Fe, Ni, W, and Co.

Yet further embodiments of the present invention comprise a thermal sprayed coating formed from a thermal spray powder comprising: one or more ternary boride ceramics of Metal-Mo—B, Metal-$Mo_2$—$B_2$, or $Metal_2$-$Mo_2$—$B_2$ from about 20-70% by weight, where Metal is Co, Ni or Fe; one or more binary molybdenum borides from 0-60% by weight; and, one or more metal binary borides from 0-50% by weight, where the one or more metal binary borides are selected from Cr, Fe, Ni, W, and Co.

Other embodiments of the present invention comprise a method of forming a thermal sprayed coating on a substrate, the steps comprising: providing a thermal spray powder comprising: one or more ternary boride ceramics of Metal-Mo—B, Metal-$Mo_2$—$B_2$, or $Metal_2$-$Mo_2$—$B_2$ from about 20-70% by weight, where Metal is Co, Ni or Fe; one or more binary molybdenum borides from 0-60% by weight; and, one or more metal binary borides from 0-50% by weight, where the one or more metal binary borides are selected from Cr, Fe, Ni, W, and Co; and, thermally spraying the thermal spray powder onto the substrate.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Figure 1:
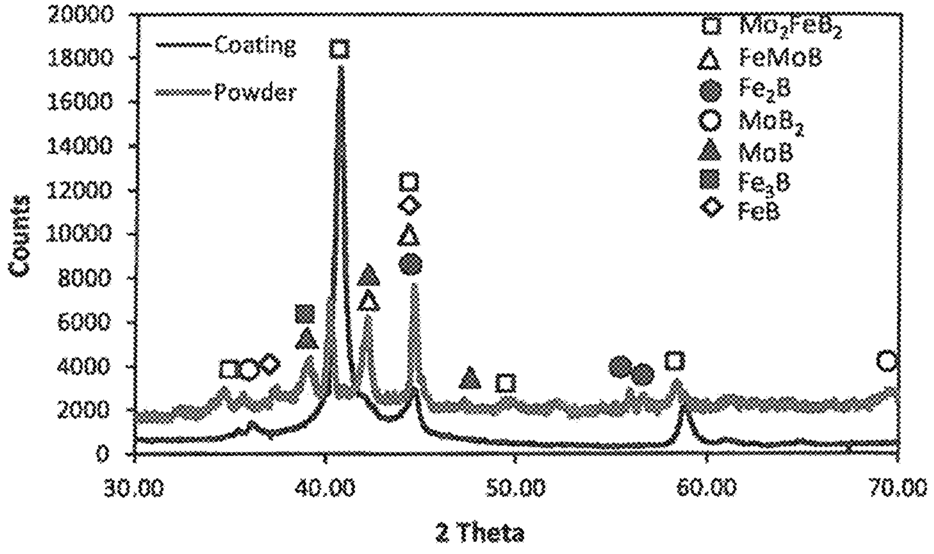
FIG. 1 is an x-ray diffraction scan showing a first pattern of a particular inventive embodiment of a sintered ternary ceramic powder and a second pattern of a particular embodiment of a sprayed coating of the powder.

Ceramics have shown the high resistance against the corrosive attacks, such as against the corrosive attacks of molten Zn, for example. Ceramics combine high wear resistance and hardness with high chemical stability at high temperatures—even in molten metal media. For example, ceramic-based coatings are beneficial for use with zinc pot rolls. Still, it has been found that, in particular situations, to provide sufficient resistance to corrosive attack, ceramic-based coatings should be sufficiently dense to provide almost zero porosity (less than 1% porosity) and thereby prevent penetration of the corrosive material to the substrate through porosity. Furthermore, to provide sufficient resistance to corrosive attack in particular instances, it is desirable to provide ceramic-based coatings having an adjusted CTE to the substrate to eliminate cracking and spallation at high temperatures.

Accordingly, the present invention provides improved thermal sprayed powder consisting of ternary and binary ceramics capable of manufacturing thermal sprayed coatings with improved properties against molten metal environments, superior thermal shock resistance, high wear resistance and low friction properties under low and high temperature conditions, where the primary crystal phase of the powder and of the thermal sprayed coating is a multi-ceramic containing ternary and binary ceramics.

In particular embodiments, the invention comprises a thermal spray powder, and in other embodiments a resulting thermal spray coating, comprising:

one or more ternary boride ceramics of Metal-Mo—B, Metal-$Mo_2$—$B_2$ or $Metal_2$-$Mo_2$—$B_2$ (which includes any combination thereof) from about 20-70% by weight, where Metal is Co, Ni or Fe;

one or more binary molybdenum borides, from 0-60% (up to 60%) by weight; and, one or more metal binary borides from 0-50% (up to 50%) by weight, where the one or more metal binary borides are selected from Cr, Fe, Ni, W, and Co.

In alternative embodiments of the powder and coating, the one or more binary molybdenum borides provided are from 20-60% by weight and/or the one or more metal binary borides range provided are from 10-50% by weight.

In further embodiments, with regard to any embodiment of the thermal spray powder, the thermal spray powder also includes:

one or more nano and submicro-sized reinforced solid lubricants from 0-10% by weight, the one or more nano and submicro-sized reinforced solid lubricants comprising BN, $WS_2$ or $MoS_2$.

With regard to said powder and the resulting coatings, ternary borides of Metal-Mo—B, Metal-$Mo_2$—$B_2$ and/or $Metal_2$-$Mo_2$—$B_2$ (where Metal is Co, Ni or Fe) exhibit superior lubrication properties due to the presence of borides, a high hardness, stability against high temperatures, and corrosion attacks due to the ternary ceramic structures. In sum, these ternary borides provide enhanced resistance to wear and corrosion. Furthermore, the binary molybdenum borides exhibit high temperature stability and corrosion resistance against molten metal. Moreover, metal binary borides comprising Cr, Fe, Ni, W, Co each generally provide resistance at high temperature, serve as binder and offer low friction due to solid lubricant effect. Nano and submicro-sized reinforced solid lubricants comprising BN, $WS_2$ or $MoS_2$ reduce friction and operate as a release agent.

A particular aspect of the present invention comprises a method of manufacturing a thermal spray powder, the steps comprising: providing a composition comprising: one or more ternary boride ceramics of Metal-Mo—B, Metal-$Mo_2$—$B_2$ or $Metal_2$-$Mo_2$—$B_2$ from about 20-70% by weight, where Metal is Co, Ni or Fe; one or more binary molybdenum borides from 0-60% by weight; and, one or more metal binary borides from 0-50% by weight, where the one or more metal binary borides are selected from Cr, Fe, Ni, W, and Co.

The inventive powders are mixed, milled, agglomerated, and sintered. In particular variations, agglomeration was also applied after sintering. Common machines are used for mixing, milling, agglomerating, and sintering. In particular embodiments, the step of milling includes milling a composition mixture comprising one or more metals from substantially 0-80% (up to substantially 80%) by weight, where the one or more metals are selected from Mo, Cr, Fe, Ni, W, and Co, and one or more binary boride ceramics from substantially 0-80% (up to substantially 80%) by weight, where the one or more metal binary borides are selected from Mo, Cr, Fe, Ni, W, and Co. In further embodiments, the composition mixture milled includes one or more solid lubricants from zero to 10% by weight. It is appreciated that any known lubricant may be employed. For example, the lubricant may comprise one or more nano and submicro-sized reinforced solid lubricants comprising BN, $WS_2$ or $MoS_2$.

Agglomeration generally refers to a process of adhering or joining particles of a composition to form a composition containing agglomerates. It is appreciated that, in particular embodiments, the step of agglomerating includes adding one or more ingredients to the milled composition mixture to form a modified milled composition mixture having a desired characteristic. For example, in particular embodiments, the modified milled composition mixture is a wet composition mixture, where a portion of the wet composition mixture is a liquid and where the desired characteristic of the wet mixture comprises a desired viscosity. Exemplary ingredients that may be added to the milled composition mixture include one or more binders, one or more surfactants, and/or water.

Subsequent to adding one or more ingredients to the milled composition mixture, if performed, the step of agglomerating transforms the milled composition mixture or a modified milled composition to an agglomerated composition, such as an agglomerated dry composition comprising a particulate or pulverulent (powdery) composition, prior to sintering. This may occur by any known process. For example, this transformation may be achieved by a drying process (as a step of drying the modified milled composition)—such as when the composition mixture being transformed is a wet composition mixture. Exemplary drying processes include spray drying, freeze drying, drum drying, and pulse combustion drying. In particular embodiments, a drying process is selected and performed to create spherical, free flowing agglomerated powders.

In particular embodiments, the sintering process is performed at temperatures not lower than 900° C. and not higher than 1300° C. for 1 to 5 hours. In other variations, the sintering process is performed from substantially 900° C. to 1000° C. for substantially 2 to 4 hours. In a more specific embodiment, the sintering process is performed at substantially 900° C. for substantially 3 hours. In particular embodiments, the material employed to create the powder (which includes the one or more ternary boride ceramics, binary molybdenum borides, metal binary borides, and any nano and submicro-sized reinforced solid lubricants) has an average particle size at least equal to 0.1 μm and no larger than 10 μm. The powder may be characterized as having these particle sizes up to the agglomerating and sintering operations (that is, through the mixing and milling processes). It is understood that the particle size may be less than 0.1 μm in other embodiments. To ready the powder for thermal spraying, agglomeration and sintering of the powder is performed to achieve any particle size sufficient for the particular spraying operation to be employed. Additionally, in particular embodiments, before the step of sintering, the agglomerated composition are debounded in a step of debinding the agglomerated composition. Furthermore, after the step of sintering, an additional step of agglomerating is performed in particular variations of these methods.

In another aspect of this invention, a method of forming a thermal sprayed coating using the above mentioned powder is provided. Particular embodiments comprise a method of forming a thermal sprayed coating on a substrate, the steps comprising: providing a thermal spray powder comprising: one or more ternary boride ceramics of Metal-Mo—B, Metal-$Mo_2$—$B_2$, or $Metal_2$-$Mo_2$—$B_2$ from about 20-70% by weight, where Metal is Co, Ni or Fe; one or more binary molybdenum borides from 0-60% by weight; and, one or more metal binary borides from 0-50% by weight, where the one or more metal binary borides are selected from Cr, Fe, Ni, W, and Co; and thermally spraying the thermal spray powder onto the substrate. It is understood that any powder described herein may be employed in other embodiments of such methods. The substrate may comprise any desired object comprised of any material. For example, in particular embodiments, the substrate is formed at least partially of a metal, including without limitation steel.

Figure 2:
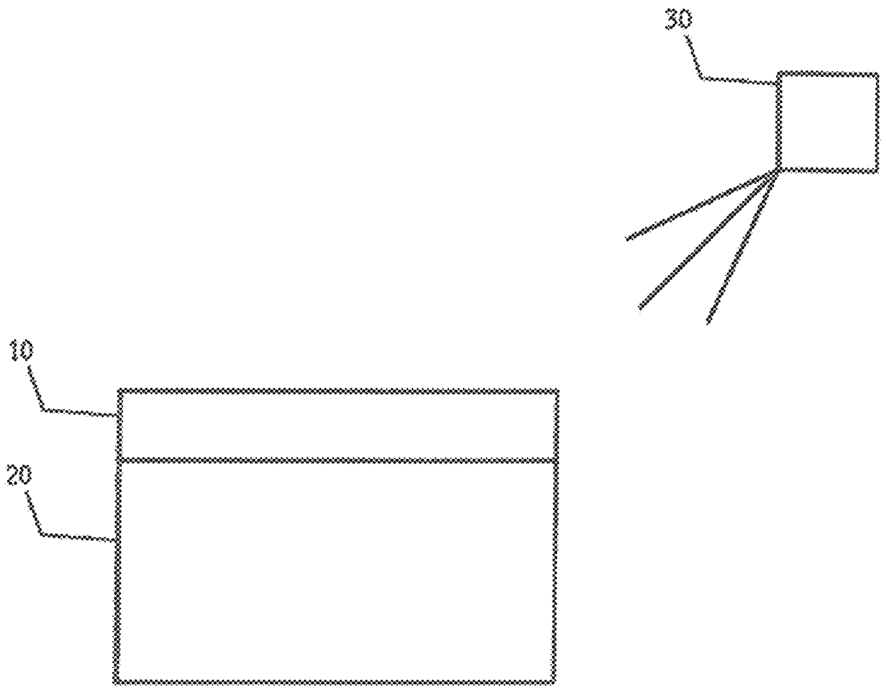
FIG. 2 is a schematic view of a thermal spray coating operation, where a thermal spray source is employing thermal spray powder to apply a coating upon a substrate in accordance with a particular embodiment of the invention.

Such methods of forming thermal sprayed coatings include spraying the thermal spray powders mentioned above (in a post-agglomeration and post-sintering state) in the range between 5 and 125 μm (micrometers), and in particular embodiments between 10 to 45 μm. Further, thermal spraying is achieved using any known machines for achieving this purpose (which is interchangeable referred to herein as a "spray source"). In particular embodiments, plasma thermal spraying, flame spraying, detonation spraying, cold gas spraying, arc spraying, or high velocity oxygen fuel spraying (each being referred to as a "spraying source") are employed to thermally spray the powder. With reference to an exemplary embodiment in FIG. 2, a spray source 30 is shown spraying a coating 10 onto a substrate 20 using the thermal spray powder disclosed herein.

In particular embodiments, the thermal sprayed coatings consist of a mixture of crystal phases of ternary and binary ceramics with low amounts of amorphous phases. In particular, the primary phase is a ternary ceramic of the Metal-Mo—B, Metal-$Mo_2$—$B_2$, and/or $Metal_2$-$Mo_2$—$B_2$ system, where Metal is Co, Fe or Ni, while secondary phases are binary borides and boron nitride. The coatings contain no less than 30% by weight and no more than 70% by weight primary phase.

Additionally, in particular embodiments, the thermal sprayed coating includes one or more solid lubricants, including without limitation, for example, boron nitride, from zero to 10% by weight. If the solid lubricant content is too high, such as 20% by weight or more, the thermal shock resistance and adhesion of the coatings will be reduced considerably.

In certain applications, the coating has a thickness of 50 to 300 μm, and in particular embodiments, a thickness of 100 to 200 μm. If the coating is thinner, the coating exhibits unsatisfactory corrosion protection. If the coating is thicker, thermal shock resistance reduces considerably.

These coatings will be applied in low and high temperature applications, where low friction and high wear resistance in addition to superior corrosion resistance against molten metal are desired. Additionally, these coatings are applicable for all wear and corrosion resistance applications.

The ternary boride ceramics discussed above were tested and evaluated. In particular, these powders and coatings were found to exhibit high thermal stability since less transformation has been seen between powder and thermal sprayed coatings. For example, with reference to FIG. 1, an x-ray diffraction (XRD) scan pattern of a sintered ternary ceramic powder is shown together with the XRD scan pattern of a sprayed coating of the powder. The main phases detected in the XRD patterns comprise ternary boride ceramics as well as small amounts of binary ceramics. In particular, the scan pattern of the powder consists of $Mo_2FeB_2$, FeMoB, MoB, FeB, $Fe_2B$ and $Fe_3B$ hard phases. Upon review, the coatings show broad diffraction peaks, which is indicative of amorphous phases. This can be explained by the high cooling rate of sprayed particles of approximately $10^6$ $ks^{-1}$ after HVOF spraying. In conclusion, the ceramics phases are extremely hard and show high thermal stability since less transformation has been seen between powder and thermal sprayed coatings (see FIG. 1).

The coatings were also evaluated after concluding over 3000 hours of Zinc immersion testing, where metal substrates spray coated with an inventive ternary boride ceramics powder were immersed in a molten zinc bath. It was observed that the coatings remained hard (Vickers hardness of 895±61 HV0.3), and were observed to feature a dense, superfine structured and homogeneous morphology with a porosity less than 1%, where only very small sized pores on a submicron level were detectable.

Furthermore, the ternary boride ceramic coatings surpassed over 3000 hours testing without dissolving, spallation or deterioration, which was 8 times longer than commercially available WC—Co coatings and over 860 times longer than uncoated stainless steel.

In a first example, in manufacturing a thermal spray composite powder, a step of milling comprises ball milling micron-sized Mo powders (a metal constituent) with substantially 70 weight percent (Wt %) FeB (a binary boride ceramic) for substantially 4 hours in a ball mill to form a milled composition mixture comprising a composite powder. In performing a step of agglomerating, after performing the step of milling, an alcohol-based binder and one or more conventional surfactants is added with water to the milled composition mixture to obtain a modified milled composition mixture generally comprising a slurry having a viscosity substantially between 200 and 300 centipoises (a centipoise is equal to a centimeter-gram-second unit of dynamic viscosity equal to one hundredth of a poise). Subsequently, an agglomerated powder is formed by spray drying the milled composition using an atomizer to create spherical, free flowing agglomerated powders where approximately two thirds of the particles have a diameter of 35 microns. These powders were debounded for substantially two hours at temperatures substantially equal to or between 100° C. and 200° C. and sintered for substantially 3 hours at substantially 900° C. to produce a ternary ceramic. These ternary ceramic powders may then be screened to substantially obtain a −230, +500 mesh cut to provide a ternary ceramic powder cut.

In evaluating this ternary ceramic powder cut, it was sprayed onto a grit-blasted 316L stainless steel substrate using a Sulzer Metco Diamond Jet 2600 HVOF unit mounted on a robot and fed by a powder feeder. The generated coating had a Vicker's hardness number (HV 300) of about 800, an adhesive strength of greater than about 8,000 pounds per square inch gauge (pursuant to ASTM 622 bonded pin adhesion test). The coating had a 180 degree bend radius of less than about 0.5 inches, and a density of about 8.7 grams per cubic centimeter. In determining the bend radius, a coupon was bent around a ½ inch diameter mandrel into a "U" shape without spallation or breaking the coating. Similar results will provide by applying of such coatings to other known high strength steels.

This coating is at least suitable for applying in molten metal baths including Zn, Zn-alloys or molten steel.

In a second example, a thermal spray composite powder was produced by mixing the Mo, FeB and BN powders, while mixing is done sometime before or after sintering of ternary ceramics.

In performing a step of milling, the composite powder was prepared by ball milling micron-sized Mo powders with substantially 70 weight percent (Wt %) FeB and one to 10 wt. % BN for substantially 4 hours in a ball mill. A alcohol-based binder and one or more conventional surfactants are then added along with water to obtain a modified milled composition mixture having a viscosity substantially equal to or between 200 and 300 centipoises. An agglomerated composition comprising a powder is formed by spray drying the generated slurry using an atomizer to create spherical, free flowing agglomerated powders where approximately two third of the particles had a diameter of 35 microns. These powders are debounded for substantially two hours at temperatures substantially equal to or between 100° C. and 200° C. and sintered for substantially 3 hours for example at substantially 900° C. to produce a ternary ceramic. These ternary ceramic powders are screened to substantially obtain a −230, +500 mesh cut.

In particular embodiments, these powders are mixed with substantially one to 10 wt % BN after ternary ceramic sintering. An agglomerated powder is formed by mixing with alcohol-based binder, conventional surfactants and water. After spray drying the powder, in particular embodiments, it is sintered. The powders are then screened to substantially obtain a −230, +500 mesh cut.

To evaluate this ternary ceramic powder cut, it was sprayed onto a grit-blasted 316L stainless steel substrate using a Sulzer Metco Diamond Jet 2600 HVOF unit mounted on a robot and fed by a powder feeder. The generated coating had a Vicker's hardness number (HV 300) of 500-700, an adhesive strength of greater than about 6,000 pounds per square inch gauge (pursuant to ASTM 622 bonded pin adhesion test). The coating had a 180 degree bend radius of less than about 0.5 inches, and a density of less than 8 grams per cubic centimeter.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A thermal spray powder comprising:

20-70% by weight one or more ternary boride ceramics of Metal-Mo—B, Metal-$Mo_2$—$B_2$, or $Metal_2$-$Mo_2$—$B_2$, where Metal is Ni or Fe;

20-60% by weight one or more binary molybdenum borides; and, 0-50% by weight one or more metal binary borides, where the metals of the one or more metal binary borides are selected from Cr, Fe, and Ni.

2. A thermal spray powder comprising:

20-70% by weight one or more ternary boride ceramics of Metal-Mo—B, Metal-$Mo_2$—$B_2$, or $Metal_2$-$Mo_2$—$B_2$, where Metal is Ni or Fe;

0-60% by weight one or more binary molybdenum borides; and, 10-50% by weight one or more metal binary borides, where the metals of the one or more metal binary borides are selected from Cr, Fe, and Ni.

3. The thermal spray powder of claim 1, where the particle size of the one or more ternary boride ceramics, the one or more binary molybdenum borides, and the one or more metal binary borides is at least equal to 0.1 μm and no larger than 10 μm.

4. The thermal spray powder of claim 3, where the average particle sizes of the powder, in a post-agglomeration and post-sintered state, range between 5 and 125 μm (micrometers).

5. The thermal spray powder of claim 3, where the average particle sizes of the powder, in a post-agglomeration and post-sintered state, range between 10 and 45 μm (micrometers).

6. The thermal spray powder of claim 1 further comprising: up to 10% by weight of one or more nano and submicro-sized reinforced solid lubricants, the one or more nano and submicro-sized reinforced solid lubricants comprising BN, $WS_2$ or $MoS_2$.

7. The thermal spray powder of claim 6, wherein the average particle size of the one or more ternary boride ceramics, the one or more binary molybdenum borides, the one or more metal binary borides, and the one or more nano and submicrosized reinforced solid lubricants is at least equal to 0.1 μm and no larger than 10 μm.

8. The thermal spray powder of claim 7, wherein the average particle sizes of the powder, in a post-agglomeration and post-sintered state, range between 5 and 125 μm (micrometers).

9. The thermal spray powder of claim 7, wherein the average particle sizes of the powder, in a post-agglomeration and post-sintered state, range between 10 and 45 μm (micrometers).

10. The thermal spray powder of claim 2, where the particle size of the one or more ternary boride ceramics, the one or more binary molybdenum borides, and the one or more metal binary borides is at least equal to 0.1 μm and no larger than 10 μm.

11. The thermal spray powder of claim 10, where the average particle sizes of the powder, in a post-agglomeration and post-sintered state, range between 5 and 125 μm (micrometers).

12. The thermal spray powder of claim 10, where the average particle sizes of the powder, in a post-agglomeration and post-sintered state, range between 10 and 45 μm (micrometers).

13. The thermal spray powder of claim 2 further comprising: up to 10% by weight of one or more nano and submicro-sized reinforced solid lubricants, the one or more nano and submicro-sized reinforced solid lubricants comprising BN, $WS_2$ or $MoS_2$.

14. The thermal spray powder of claim 13, wherein the average particle size of the one or more ternary boride ceramics, the one or more binary molybdenum borides, the one or more metal binary borides, and the one or more nano and submicrosized reinforced solid lubricants is at least equal to 0.1 μm and no larger than 10 μm.

15. The thermal spray powder of claim 14, wherein the average particle sizes of the powder, in a post-agglomeration and post-sintered state, range between 5 and 125 μm (micrometers).

16. The thermal spray powder of claim 14, wherein the average particle sizes of the powder, in a post-agglomeration and post-sintered state, range between 10 and 45 μm (micrometers).

* * * * *